United States Patent
Kim

(10) Patent No.: US 12,526,855 B2
(45) Date of Patent: Jan. 13, 2026

(54) METHOD FOR RAPIDLY RECOVERING COMMUNICATION CONNECTION IN SIDELINK COMMUNICATION AND DEVICE FOR SAME

(71) Applicant: LG ELECTRONICS INC., Seoul (KR)

(72) Inventor: Byounggill Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 18/038,166

(22) PCT Filed: Nov. 24, 2021

(86) PCT No.: PCT/KR2021/017327
§ 371 (c)(1),
(2) Date: May 22, 2023

(87) PCT Pub. No.: WO2022/114748
PCT Pub. Date: Jun. 2, 2022

(65) Prior Publication Data
US 2024/0008109 A1    Jan. 4, 2024

(30) Foreign Application Priority Data
Nov. 25, 2020 (KR) .......... 10-2020-0160328

(51) Int. Cl.
*H04W 76/11* (2018.01)
*H04W 88/04* (2009.01)

(52) U.S. Cl.
CPC ............ *H04W 76/11* (2018.02); *H04W 88/04* (2013.01)

(58) Field of Classification Search
CPC ....... H04W 76/11; H04W 88/04; H04W 4/40; H04W 16/28; H04W 76/14; H04W 76/18; H04W 76/19; H04W 92/18; H04W 24/08; H04W 72/0446; H04W 72/0453; H04W 72/25; H04B 7/06; H04B 17/309; H04B 7/06964
See application file for complete search history.

(56) References Cited

U.S. PATENT DOCUMENTS

| | | | |
|---|---|---|---|
| 2017/0142741 A1* | 5/2017 | Kaur | H04W 72/121 |
| 2018/0242381 A1* | 8/2018 | Wei | H04W 40/22 |
| 2020/0221298 A1* | 7/2020 | Pan | H04W 12/50 |
| 2021/0400746 A1* | 12/2021 | Kuo | H04W 80/02 |
| 2023/0300713 A1* | 9/2023 | Hoang | H04W 40/24 370/254 |

* cited by examiner

*Primary Examiner* — Ricky Q Ngo
*Assistant Examiner* — David M Kayal
(74) *Attorney, Agent, or Firm* — BRYAN CAVE LEIGHTON PAISNER LLP

(57) ABSTRACT

Provided are a method for rapidly recovering a communication connection in sidelink communication and/or Vehicle-to-Everything (V2X) communication in a millimeter wave (mmWave)/terahertz (THz) band, and a device for same. A relay User Equipment (UE) transmits a relay link proposal message to a first UE on the basis of the matching of a first source UE ID indicating a first UE with a second target UE ID, and the matching of a second source UE ID indicating a second UE with a first target UE ID.

15 Claims, 13 Drawing Sheets

METHOD FOR RAPIDLY RECOVERING COMMUNICATION CONNECTION IN SIDELINK COMMUNICATION AND DEVICE FOR SAME

CROSS-REFERENCE TO RELATED APPLICATIONS

This application is the National Stage filing under 35 U.S.C. 371 of International Application No. PCT/KR2021/017327, filed on Nov. 24, 2021, which claims the benefit of Korean Patent Application No. 10-2020-0160328 filed on Nov. 25, 2020, which is hereby incorporated by reference herein in its entirety.

TECHNICAL FIELD

The present disclosure relates to a method and apparatus for rapidly recovering communication connection in sidelink communications and/or Vehicle-to-everything (V2X) communications in millimeter-wave (mmWave)/terahertz (THz) bands.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU Radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile BroadBand (eMBB), massive Machine Type Communications (mMTC), Ultra-Reliable and Low Latency Communications (URLLC), etc. The NR shall be inherently forward compatible.

Sidelink (SL) refers to a communication method that establishes a direct link between User Equipments (UE) to directly exchange voice or data between UEs without going through a base station. SL is being considered as a way to solve the burden of base stations due to rapidly increasing data traffic.

Vehicle-To-Everything (V2X) refers to a communication technology that exchanges information with other vehicles, pedestrians, infrastructure objects, etc., through wired and wireless communication. V2X may be categorized into four types: Vehicle-To-Vehicle (V2V), Vehicle-To-Infrastructure (V2I), Vehicle-To-Network (V2N), and/or Vehicle-To-Pedestrian (V2P). V2X communication may be provided through the PC5 interface and/or the Uu interface.

SUMMARY

In the future, vehicle-related applications such as autonomous driving using V2X communications may be commercialized. These vehicle-related applications require high-capacity data transmission, which requires high-frequency communications in the millimeter-wave (mmWave) band and/or terahertz (THz) band.

High-frequency communications may require beamforming to compensate for high path attenuation. However, due to the path attenuation and penetration attenuation characteristics of high-frequency communications, the direct path between vehicles can be obstructed by obstacles, which can result in link failure. In the event of a link failure, the vehicles may perform a Beam Failure Recovery (BFR) procedure, and if even BFR fails, they may discover the relay link. However, if the BFR procedure and the relay link discovery procedure are performed independently, communication recovery may be delayed.

To address the above problems, the present disclosure provides a method that can quickly perform a BFR procedure and a relay link discovery procedure to minimize communication recovery delay. According to implementations of the present disclosure, a method for suggesting a relay link connection using a beam failure recovery request response message/resource, by applying a method for performing beam recovery using a sidelink discovery signal, may be provided.

In an aspect, a method performed by a relay User Equipment (UE) in a wireless communication system is provided. The method comprises, transmitting a relay link suggestion message to the first UE, based on matching of the first source UE ID with the second target UE ID indicating the first UE and matching of the second source UE ID with the first target UE ID indicating the second UE.

In another aspect, an apparatus for implementing the above method is provided.

The present disclosure can have various advantageous effects.

For example, in a beam failure situation, a beam failure recovery procedure and a relay discovery procedure can be performed without performing separate procedures.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
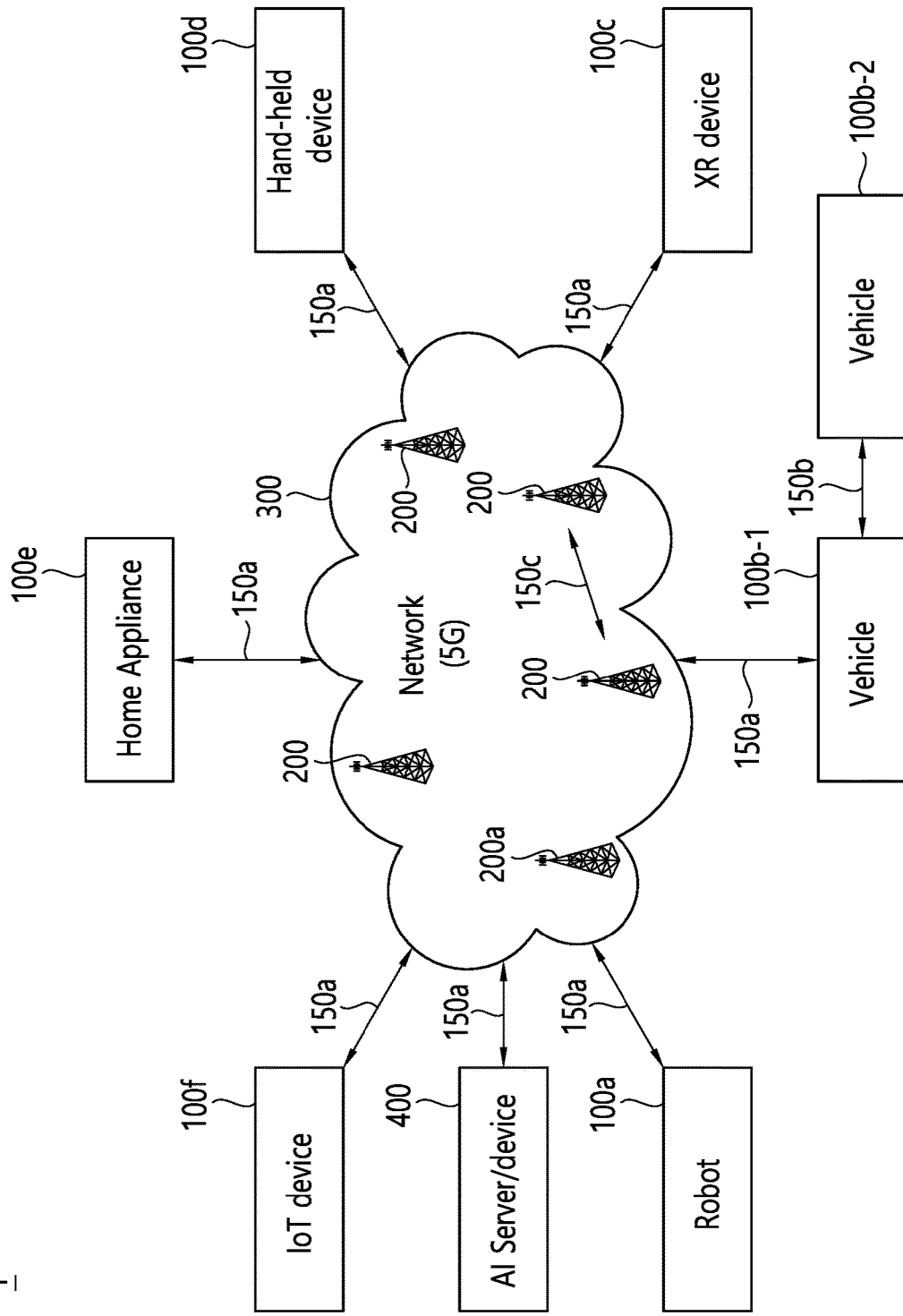
FIG. 1 shows an example of a communication system to which implementations of the present disclosure are applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100*a* to 100*f,* Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an eXtended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a Closed-Circuit TV (CCTV), a recorder, or a black box.

The FinTech device may be, for example, a device capable of providing a financial service such as mobile payment. For example, the FinTech device may include a payment device or a Point of Sales (PoS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through Computer Graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

Figure 2:
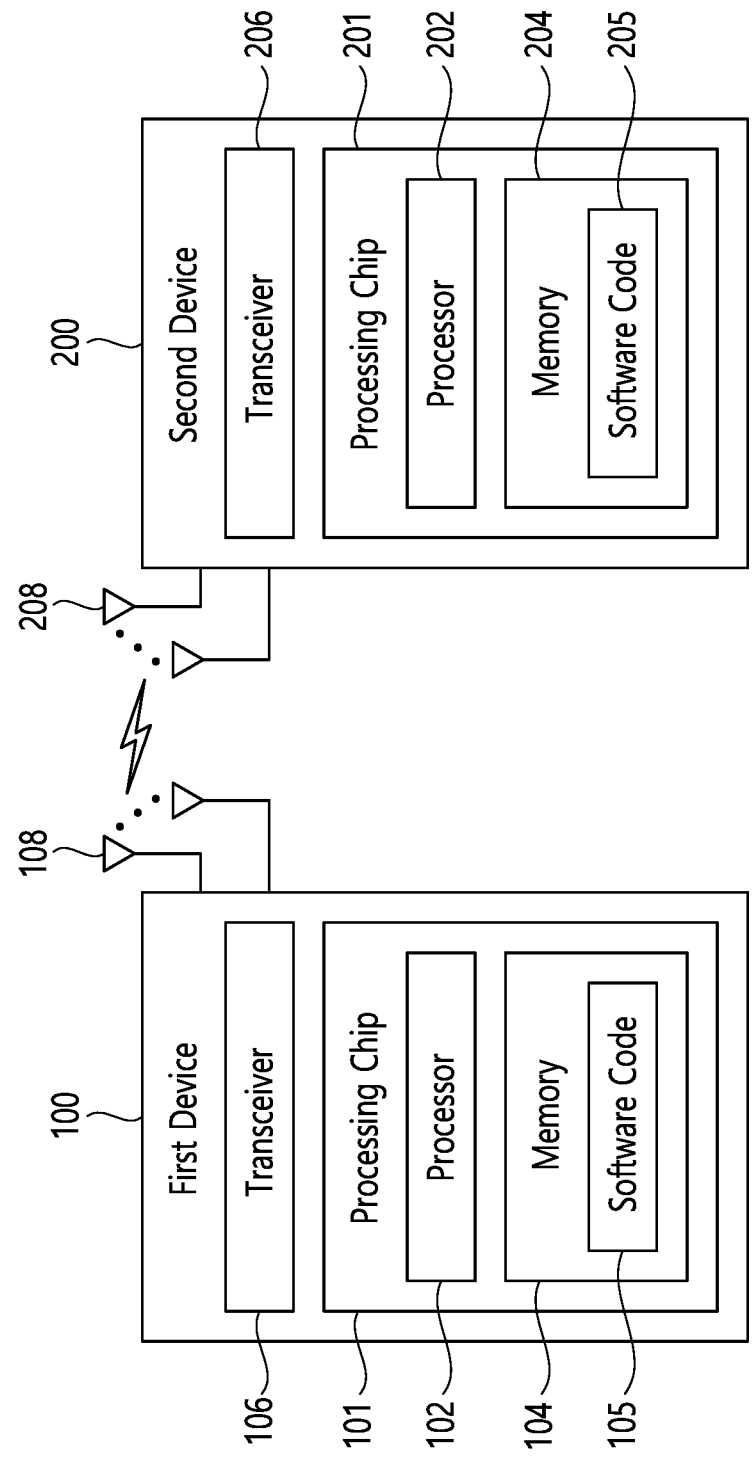
FIG. 2 shows an example of wireless devices to which implementations of the present disclosure are applied.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/ signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs) and/or one or more Service Data Units (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable ROMs (EEPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in UL and as a receiving device in DL. In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a Node B (NB), an eNode B (eNB), or a gNB.

Figure 3:
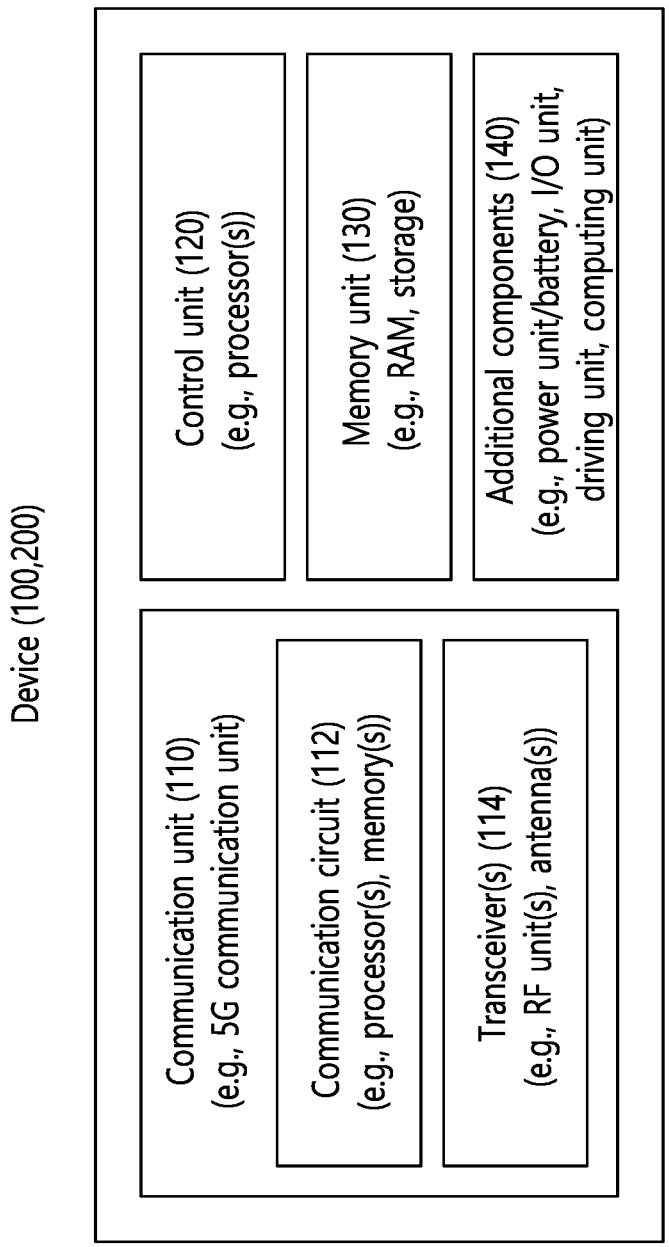
FIG. 3 shows an example of a wireless device to which implementations of the present disclosure are applied.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, Input/Output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG.

1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an Application Processor (AP), an Electronic Control Unit (ECU), a Central Processing Unit (CPU), a Graphical Processing Unit (GPU), and a memory control processor. As another example, the memory unit 130 may be configured by a RAM, a Dynamic RAM (DRAM), a ROM, a flash memory, a volatile memory, a non-volatile memory, and/or a combination thereof.

Figure 4:
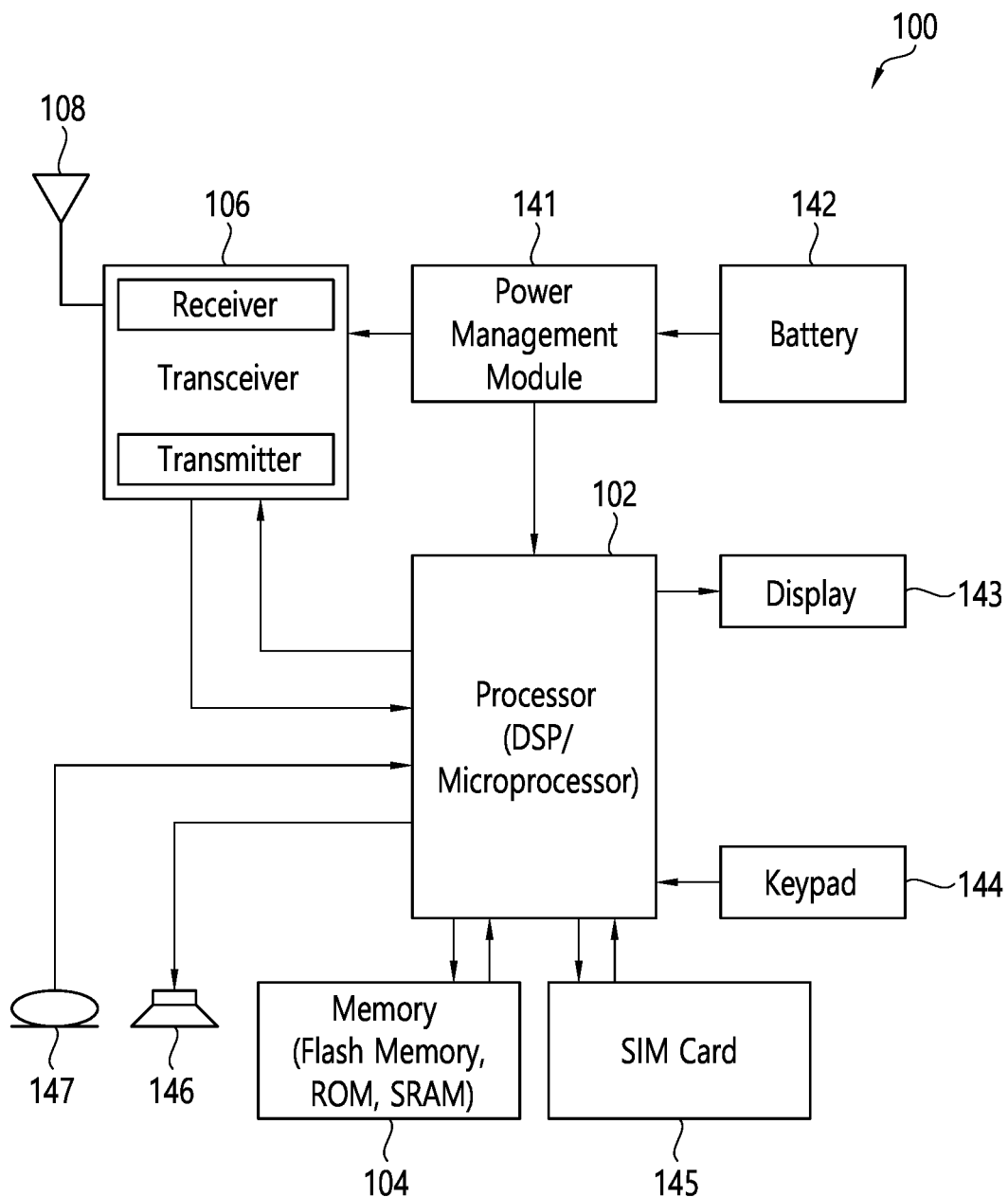
FIG. 4 shows an example of UE to which implementations of the present disclosure are applied.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 5:
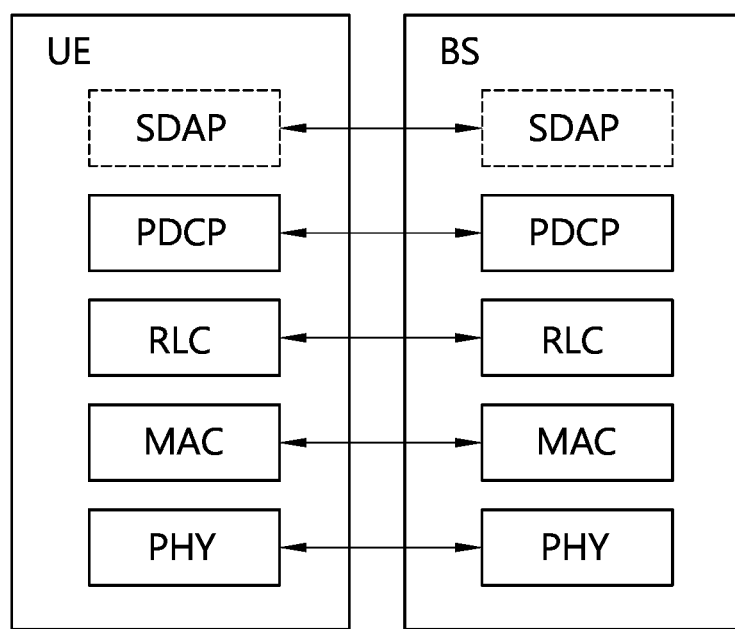
FIGS. 5 and 6 show an example of protocol stacks in a 3GPP based wireless communication system to which implementations of the present disclosure are applied.
Figure 6:
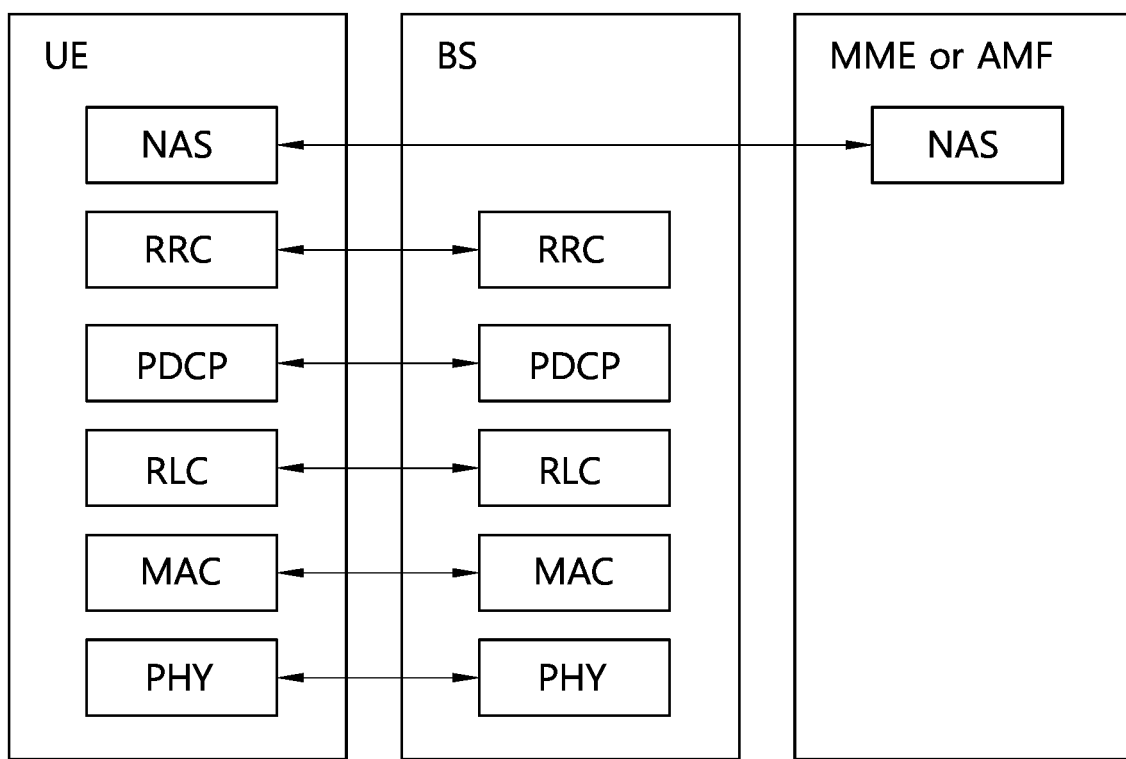

FIGS. 5 and 6 show an example of protocol stacks in a 3GPP based wireless communication system to which implementations of the present disclosure are applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a Non-Access Stratum (NAS) layer. Layer 1, Layer 2 and Layer 3 are referred to as an Access Stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network Quality of Service (QoS) flows.

In the 3GPP NR system, the main services and functions of the MAC sublayer include: mapping between logical channels and transport channels; multiplexing/de-multiplexing of MAC SDUs belonging to one or different logical channels into/from Transport Blocks (TB) delivered to/from the physical layer on transport channels; scheduling information reporting; error correction through Hybrid Automatic Repeat reQuest (HARQ) (one HARQ entity per cell in case of Carrier Aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast Control Channel (BCCH) is a downlink logical channel for broadcasting system control information, Paging Control Channel (PCCH) is a downlink logical channel that transfers paging information, system information change notifications and indications of ongoing Public Warning Service (PWS) broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In downlink, the following connections between logical channels and transport channels exist: BCCH can be mapped to Broadcast Channel (BCH); BCCH can be mapped to Downlink Shared Channel (DL-SCH); PCCH can be mapped to Paging Channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to Uplink Shared Channel (UL-SCH); DCCH can be mapped to UL-SCH; and DTCH can be mapped to UL-SCH.

The RLC sublayer supports three transmission modes: Transparent Mode (TM), Unacknowledged Mode (UM), and Acknowledged Mode (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using Robust Header Compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS Flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G Core network (5GC) or Next-Generation Radio Access Network (NG-RAN); establishment, maintenance and release of an RRC connection between the UE and NG-RAN; security functions including key management; establishment, configuration, maintenance and release of Signaling Radio Bearers (SRBs) and Data Radio Bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
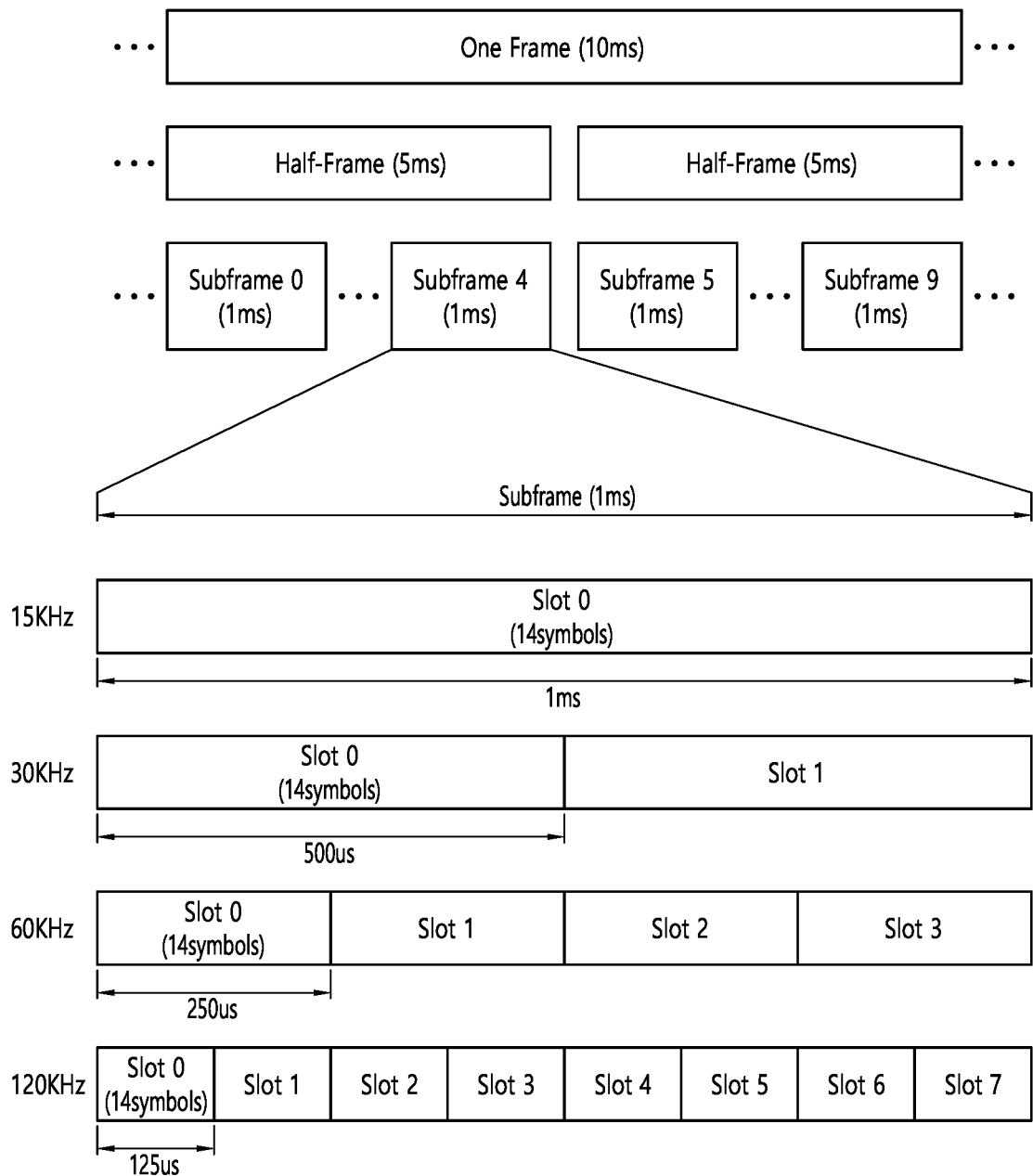
FIG. 7 shows a frame structure in a 3GPP based wireless communication system to which implementations of the present disclosure are applied.

FIG. 7 shows a frame structure in a 3GPP based wireless communication system to which implementations of the present disclosure are applied.

The frame structure shown in FIG. 7 is purely exemplary and the number of subframes, the number of slots, and/or the number of symbols in a frame may be variously changed. In the 3GPP based wireless communication system, OFDM numerologies (e.g., SCS, Transmission Time Interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or Cyclic Prefix (CP)-OFDM symbols), SC-FDMA symbols (or Discrete Fourier Transform-spread-OFDM (DFT-s-OFDM) symbols).

Referring to FIG. 7, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a CP. In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |

TABLE 3-continued

| u | $N^{slot}_{symb}$ | $N^{frame,u}_{slot}$ | $N^{subframe,u}_{slot}$ |
|---|---|---|---|
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at Common Resource Block (CRB) $N^{start,u}_{grid}$ indicated by higher-layer signaling (e.g., RRC signaling), where $N^{size,u}_{grid,x}$ is the number of Resource Blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a Resource Element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and Physical Resource Blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a BandWidth Part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the PHY layer, the uplink transport channels UL-SCH and Random Access Channel (RACH) are mapped to their physical channels Physical Uplink Shared Channel (PUSCH) and Physical Random Access Channel (PRACH), respectively, and the downlink transport channels DL-SCH, BCH and PCH are mapped to Physical Downlink Shared Channel (PDSCH), Physical Broadcast Channel (PBCH) and PDSCH, respectively. In the PHY layer, Uplink Control Information (UCI) is mapped to PUCCH, and Downlink Control Information (DCI) is mapped to Physical Downlink Control Channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Beam Failure Detection (BFD) and Beam Failure Recovery (BFR) are described. Section 9.2.8 of 3GPP TS 38.300 V16.3.0 (2020-09) and section 5.17 of 3GPP TS 38.321 V16.2.1 (2020-09) may be referred.

For beam failure detection, the gNB configures the UE with beam failure detection reference signals (Synchronization Signal/PBCH Block (SSB) or Channel State Information Reference Signal (CSI-RS)), and the UE declares beam failure when the number of beam failure instance indications from the physical layer reaches a configured threshold before a configured timer expires.

SSB-based beam failure detection is based on the SSB associated to the initial DL BWP and can only be configured for the initial DL BWPs and for DL BWPs containing the SSB associated to the initial DL BWP. For other DL BWPs, beam failure detection can only be performed based on CSI-RS.

After beam failure is detected on PCell, the UE performs the followings.

Triggers beam failure recovery by initiating a random access procedure on the Primary Cell (PCell);

Selects a suitable beam to perform beam failure recovery (if the gNB has provided dedicated random access resources for certain beams, those will be prioritized by the UE).

Upon completion of the random access procedure, beam failure recovery is considered complete.

Figure 8:
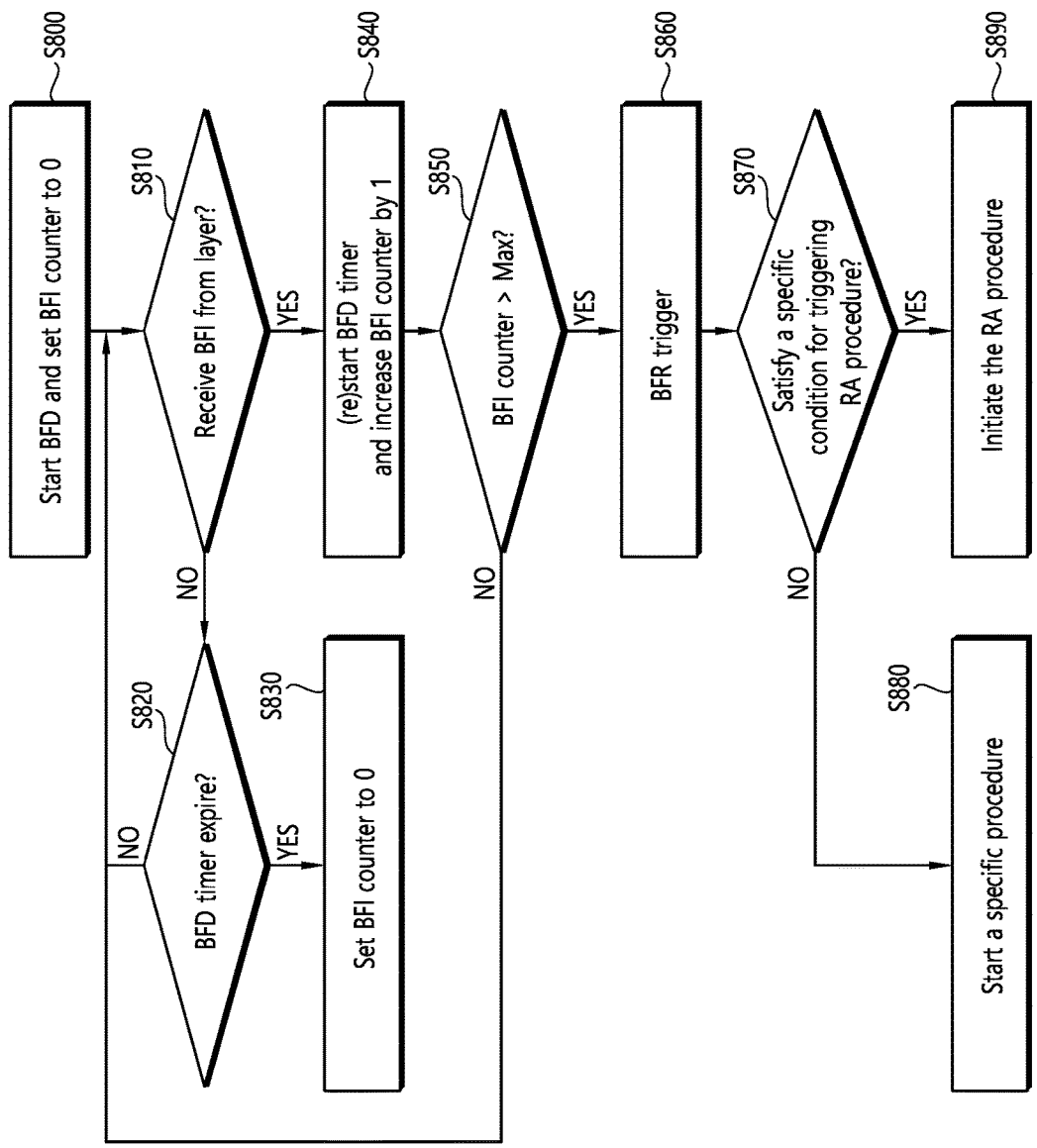
FIG. 8 shows an example of a beam failure recovery procedure to which implementations of the present disclosure are applied.

FIG. 8 shows an example of a beam failure recovery procedure to which implementations of the present disclosure are applied.

The MAC entity may be configured by RRC per serving cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing random access procedure for beam failure recovery for Special Cell (SpCell), the MAC entity stops the ongoing random access procedure and initiate a random access procedure using the new configuration.

RRC configures the following parameters in the BeamFailureRecoveryConfig and the RadioLinkMonitoringConfig for the beam failure detection and recovery procedure.

beamFailureInstanceMaxCount for the beam failure detection;

beamFailureDetectionTimer for the beam failure detection;

beamFailureRecoveryTimer for the beam failure recovery procedure;

rsrp-ThresholdSSB: A Reference Signal Received Power (RSRP) threshold for the beam failure recovery;

powerRampingStep: powerRampingStep for the SpCell beam failure recovery;

powerRampingStepHighPriority: powerRampingStepHighPriority for the SpCell beam failure recovery;

preambleReceivedTargetPower: preambleReceivedTargetPower for the SpCell beam failure recovery;
preambleTransMax: preambleTransMax for the SpCell beam failure recovery;
scalingFactorBI: scalingFactorBI for the SpCell beam failure recovery;
ssb-perRACH-Occasion: ssb-perRACH-Occasion for the SpCell beam failure recovery;
ra-ResponseWindow: the time window to monitor response(s) for the SpCell beam failure recovery using contention-free random access preamble;
prach-ConfigurationIndex: prach-ConfigurationIndex for the SpCell beam failure recovery;
ra-ssb-OccasionMaskIndex: ra-ssb-OccasionMaskIndex for the SpCell beam failure recovery;
ra-OccasionList: ra-OccasionList for the SpCell beam failure recovery.

The MAC entity initiates BFD, and sets Beam Failure Instance Indication (BFI) counter (e.g., BFI_COUNTER) to 0 (step S800).

The MAC entity performs the followings for each serving cell configured for beam failure detection.
   1> if beam failure instance indication has been received from lower layers (step S810):
   2> start or restart the beamFailureDetectionTimer (step S840);
   2> increment BFI_COUNTER by 1 (step S840);
   2> if BFI_COUNTER>=beamFailureInstanceMaxCount (step S850):
   3> if the serving cell is Seconndary Cell (SCell):
   4> trigger a BFR for this serving cell (step S860);
   3> else (step S870):
   4> initiate a random access procedure on the SpCell (step S890).
   1> if the beamFailureDetectionTimer expires (step S820); or
   1> if beamFailureDetectionTimer, beamFailureInstanceMaxCount, or any of the reference signals used for beam failure detection is reconfigured by upper layers associated with this serving cell:
   2> set BFI_COUNTER to 0 (step S830).
   1> if the serving cell is SpCell and the random access procedure initiated for SpCell beam failure recovery is successfully completed:
   2> set BFI_COUNTER to 0;
   2> stop the beamFailureRecoveryTimer, if configured;
   2> consider the beam failure recovery procedure successfully completed.
   1> else if the serving cell is SCell, and a PDCCH addressed to Cell radio Network Temporary Identity (C-RNTI) indicating uplink grant for a new transmission is received for the HARQ process used for the transmission of the BFR MAC Control Element (CE) or Truncated BFR MAC CE which contains beam failure recovery information of this serving cell; or
   1> if the SCell is deactivated:
   2> set BFI_COUNTER to 0;
   2> consider the beam failure recovery procedure successfully completed and cancel all the triggered BFRs for this serving cell.

The MAC entity performs the followings (step S880).
   1> if the beam failure recovery procedure determines that at least one BFR has been triggered and not cancelled:
   2> if UL-SCH resources are available for a new transmission and if the UL-SCH resources can accommodate the BFR MAC CE plus its subheader as a result of Logical Channel Prioritization (LCP):
   3> instruct the Multiplexing and Assembly procedure to generate the BFR MAC CE.
   2> else if UL-SCH resources are available for a new transmission and if the UL-SCH resources can accommodate the Truncated BFR MAC CE plus its subheader as a result of LCP:
   3> instruct the Multiplexing and Assembly procedure to generate the Truncated BFR MAC CE.
   2> else:
   3> trigger the SR for SCell beam failure recovery for each SCell for which BFR has been triggered and not cancelled.

All BFRs triggered for an SCell are cancelled when a MAC PDU is transmitted and this PDU includes a BFR MAC CE or Truncated BFR MAC CE which contains beam failure information of that SCell.

Hereinafter, Vehicle-To-Everything (V2X) communications and/or Sidelink (SL) communications are described.

For example, the UE1 may select a resource unit corresponding to a particular resource within a resource pool, which is a set of resources. The UE1 may then transmit an SL signal using the resource unit. For example, the UE2, the receiving UE, may be configured with a resource pool over which the UE1 may transmit the signal, and may detect the signal of UE1 within the resource pool.

Here, if the UE1 is within the connectivity range of the base station, the base station may inform the UE1 of the resource pool. On the other hand, if the UE1 is out of the connectivity range of the base station, another UE may inform the UE1 of the resource pool, or the UE1 may use a preconfigured resource pool.

In general, a resource pool may consist of a plurality of resource units, and each UE may select one or more resource units to use for its SL signal transmission.

A resource unit may appear periodically and repeatedly. Alternatively, the index of the physical resource unit to which one logical resource unit is mapped may vary over time in a predetermined pattern, in order to achieve a diversity effect in the time or frequency domain. In terms of the structure of these resource units, a resource pool may refer to a set of resource units that are available for transmission by a UE that wishes to transmit SL signaling.

Hereinafter, resource allocation in SL is described.

A UE may perform V2X communication and/or SL communication depending on the transmission mode. The transmission mode may be referred to as a mode and/or a resource allocation mode. The transmission mode in an LTE system may be referred to as an LTE transmission mode, and the transmission mode in an NR system may be referred to as an NR resource allocation mode. LTE transmission mode 1/2 may be applied to general SL communication, and LTE transmission mode 3/4 may be applied to V2X communication.

In LTE transmission mode 1, LTE transmission mode 3, and/or NR resource allocation mode 1, the base station may schedule the SL resources to be used by the UEs for SL transmission. For example, the base station may perform resource scheduling by transmitting a DCI via PDCCH to UE1, and UE1 may perform V2X communication and/or SL communication with UE2 based on the resource scheduling. For example, UE1 may transmit Sidelink Control Information (SCI) to UE2 via a Physical Sidelink Control Channel (PSCCH), and then transmit data based on the SCI to UE2 via a Physical Sidelink Shared Channel (PSSCH).

For example, in NR resource allocation mode 1, the UE may be provided and/or allocated resources for one or more SL transmissions of one TB by the base station via dynamic grant. For example, the base station may provide resources to the UE for the transmission of PSCCH and/or PSSCH using dynamic grant. For example, the transmitting UE may report to the base station the SL HARQ feedback received from the receiving UE. In this case, the PUCCH resources and timing for reporting the SL HARQ feedback to the base station may be determined based on the instructions in the PDCCH for the base station to allocate resources for SL transmission.

For example, in NR resource allocation mode 1, the UE may periodically be provided and/or allocated a set of resources for a plurality of SL transmissions by the base station via a configured grant. For example, the configured grant may include a configured grant type 1 or a configured grant type 2. For example, the UE may determine the TB to be transmitted at each of the occasions indicated by a given configured grant.

In LTE transmission mode 2, LTE transmission mode 4, and/or NR resource allocation mode 2, the UE may determine the SL transmission resource within the SL resource configured by the base station/network and/or the preconfigured SL resource. For example, the configured SL resource and/or the preconfigured SL resource may be a resource pool. For example, the UE may autonomously select or schedule resources for SL transmission. For example, the UE may autonomously select a resource within the configured resource pool to perform V2X communication and/or SL communication. For example, the UE may perform a sensing and resource (re)selection procedure to autonomously select a resource within a selection window. For example, the sensing may be performed on a subchannel unit. Then, upon autonomously selecting a resource within the resource pool, UE1 may transmit a SCI to UE2 via PSCCH, and then transmit data based on the SCI to UE2 via PSSCH.

The V2X communication and/or SL communication may use relay communication. That is, one vehicle and/or UE participating in the V2X communication and/or SL communication may relay communication between a plurality of vehicles and/or UEs and/or communication between the network and the vehicles and/or UEs.

Figure 9:
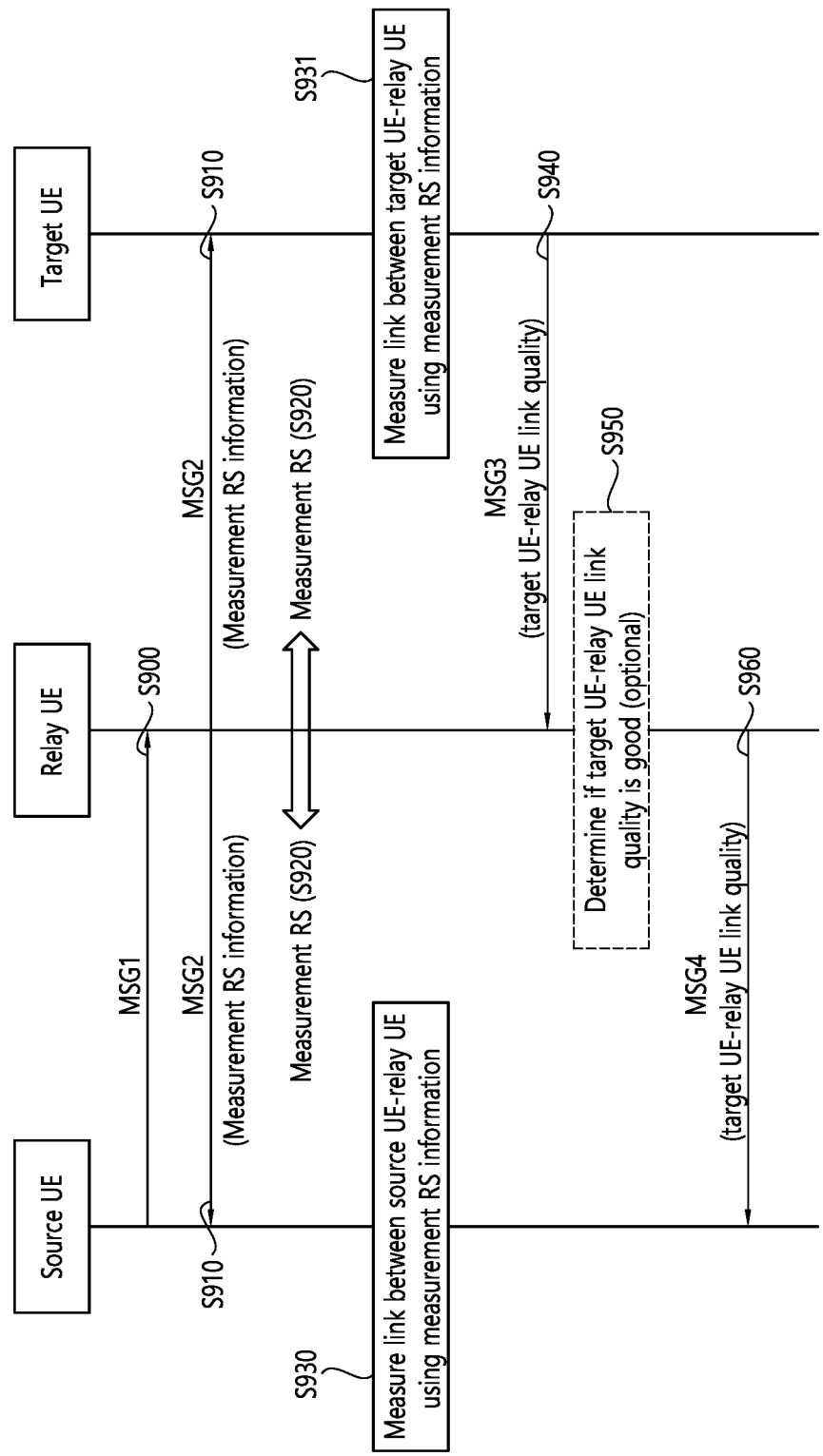
FIG. 9 shows an example of a signaling flow for UE-UE relay selection to which implementations of the present disclosure are applied.

FIG. 9 shows an example of a signaling flow for UE-UE relay selection to which implementations of the present disclosure are applied.

In step S900, the source UE transmits MSG1, a message indicating that it is discovering a relay UE in proximity to the target UE. The MSG1 may be broadcast or groupcast. The MSG1 may include an ID of the source UE, an ID of the target UE, and/or an indicator that the source UE is discovering a relay UE.

A relay UE for which the MSG1 is intended and which is willing to relay data communications for the source UE may determine whether the target UE is in its proximity. In step S910, the relay UE transmits MSG2 to discover the target UE. The MSG2 may be broadcast or groupcast. The MSG2 may include at least one of an ID of the source UE, an ID of the target UE, and/or an ID of the relay UE.

In addition to transmitting the MSG2, in step S920, the relay UE initiates transmission of a reference signal for measuring link quality by the source UE and the target UE. The source UE and the target UE may identify a reference signal specific to the relay UE based on a sequence identifier and/or time/frequency resource information associated with the reference signal. The information associated with the reference signal (sequence identifier and/or time/frequency resource information) may be transmitted via MSG2 by the relay UE.

If the target UE receives the MSG2 from the relay UE and wishes to communicate with the source UE, in step S931, the target UE starts measuring the link quality (at least one of Channel Quality Indicator (CQI), Received Signal Strength Indicator (RSSI), RSRP, Reference Signal Received Quality (RSRQ)) with the relay UE. The target UE measures the link quality using the MSG2 or the measurement reference signal transmitted by the relay UE.

After measuring the link quality, in step S940, the target UE transmits MSG3 to the relay UE. The MSG3 may include at least one of an ID of the source UE, an ID of the target UE, and/or an ID of the relay UE. The MSG3 may include link quality information (i.e., at least one of CQI/RSSI/RSRP/RSRQ) between the target UE and the relay UE. The target UE may transmit the MSG3 if the link quality between the target UE and the relay UE is greater than a threshold value.

The source UE may also receive an MSG2 from the relay UE. In step S930, the source UE measures the link quality using the MSG2 or measurement reference signal transmitted by the relay UE.

The relay UE receives the MSG3 transmitted by the target UE. In step S950, the relay UE may optionally determine whether the link quality between the target UE and the relay UE is good.

In step S960, the relay UE transmits an MSG4 to the source UE, indicating that the relay UE is in proximity to the target UE and is willing to relay data communications for the source UE to the target UE. The MSG4 may include link quality information (i.e., at least one of CQI/RSSI/RSRP/RSRQ) between the target UE and the relay UE.

In the future, V2X communication and/or SL communication may be used for applications such as autonomous driving that require large amounts of data. It has been discussed to perform V2X communication and/or SL communication in high frequency bands, such as the millimeter wave (mmWave) band and/or the terahertz (THz) band, to handle large data volumes.

At high frequencies such as mmWave and/or THz bands, beamforming is essential due to the high path attenuation. However, communication for beamforming may not be possible due to the nature of high frequencies, where diffraction is almost non-existent if the direct path of the radio waves is blocked by obstacles.

If beam tracking is not possible due to obstacles, the beam failure recovery procedure described in FIG. 8 may be performed. However, the beam failure recovery procedure may not restore the communication connection. In this case, the relay discovery procedure described in FIG. 9 may be performed as a method of restoring the communication connection. However, in general, the beam failure recovery procedure and the relay discovery procedure may be performed independently. That is, the beam failure recovery procedure and the relay discovery procedure are separated, such that the relay discovery procedure to find a new relay UE may be subsequently initiated after determining that the beam recovery failure procedure has failed. In this case, there may be a significant time delay in restoring the communication connection.

Figure 10:
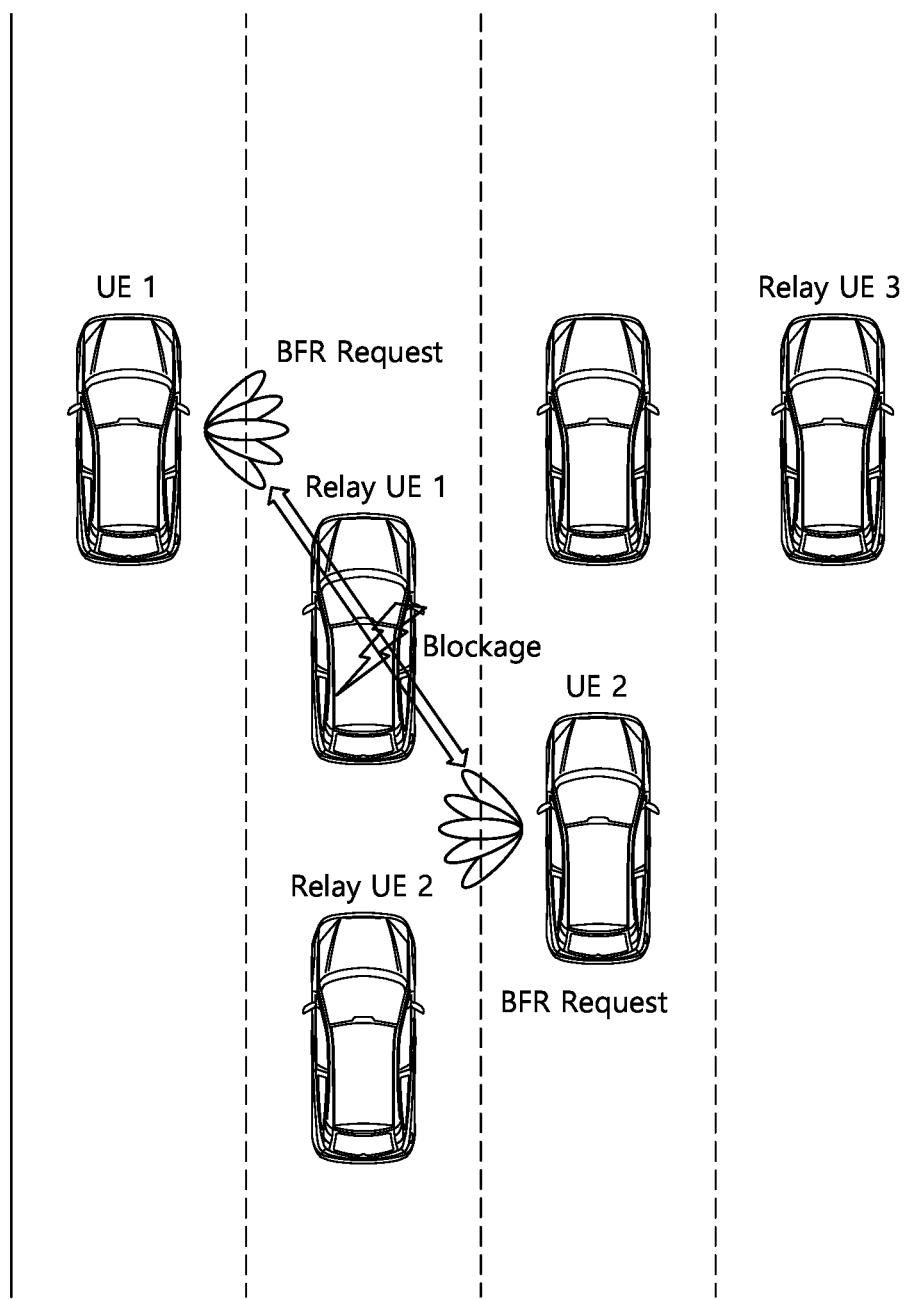
FIG. 10 shows an example of a situation in which an obstacle occurs by a vehicle when performing V2X communication and/or SL communication in the mmWave band to which implementations of the present disclosure are applied.

FIG. 10 shows an example of a situation in which an obstacle occurs by a vehicle when performing V2X communication and/or SL communication in the mmWave band to which implementations of the present disclosure are applied.

Referring to FIG. 10, a situation is shown in which UE 1 and UE 2 are performing V2X communication and/or SL communication in the mmWave band and the communication connection is blocked by another vehicle. If the beam failure recovery procedure is performed in this situation, the beam failure recovery procedure cannot succeed because the direct communication path is blocked by the relay UE 1. In this situation, relay communication should be used to restore the communication connection between UE 1 and UE 2. But, if it is attempted to find a relay UE and establish a relay communication connection after determining that the beam failure recovery procedure has failed, there may be a significant time delay in restoring the communication connection.

Therefore, there is a need for a communication connection recovery method that can minimize the time delay as much as possible.

According to implementations of the present disclosure, a relay UE capable of performing relaying may monitor beam failure recovery request resources/messages, and when a beam failure recovery situation occurs, may suggest to establish a relay link using beam failure recovery request response resources/messages. Accordingly, without a separate relay discovery procedure, the UE that transmitted the beam failure recovery request response message may choose whether to restore the connection of the existing link or establish a new relay link, depending on the situation, by considering the beam failure recovery request response messages transmitted by other UEs and/or the quality of the communication connection. That is, an optimal communication connection recovery method may be selected.

According to implementations of the present disclosure, when a UE capable of performing a relay receives a beam failure recovery request signal/message, if it is willing to provide a relay communication connection, it may suggest the establishment of a relay link using a beam failure recovery request response message/signal and/or resources therefor. The condition for transmitting a Relay Link Suggestion (RLS) may be that it has received a beam failure recovery request from two or more UEs and has found a matching pair of source ID and target UE ID within the received beam failure recovery request. Alternatively, the condition for transmitting the RLS may be that the link quality between the two UEs connected to the relay UE satisfies certain conditions.

According to implementations of the present disclosure, when an RLS is transmitted using a beam failure recovery request response message/signal and/or resources therefor, certain field values in the beam failure recovery request response message/signal may be set to certain values to indicate that the corresponding message/signal is an RLS.

According to implementations of the present disclosure, the RLS may include at least one of the following.

Source UE ID
Target UE ID
Link quality information between the source UE and the relay UE
Link quality information between the target UE and the relay UE
Frequency resource information available on the relay link (e.g., number of RBs)
Time resource information available on the relay link (e.g., number of time slots)

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
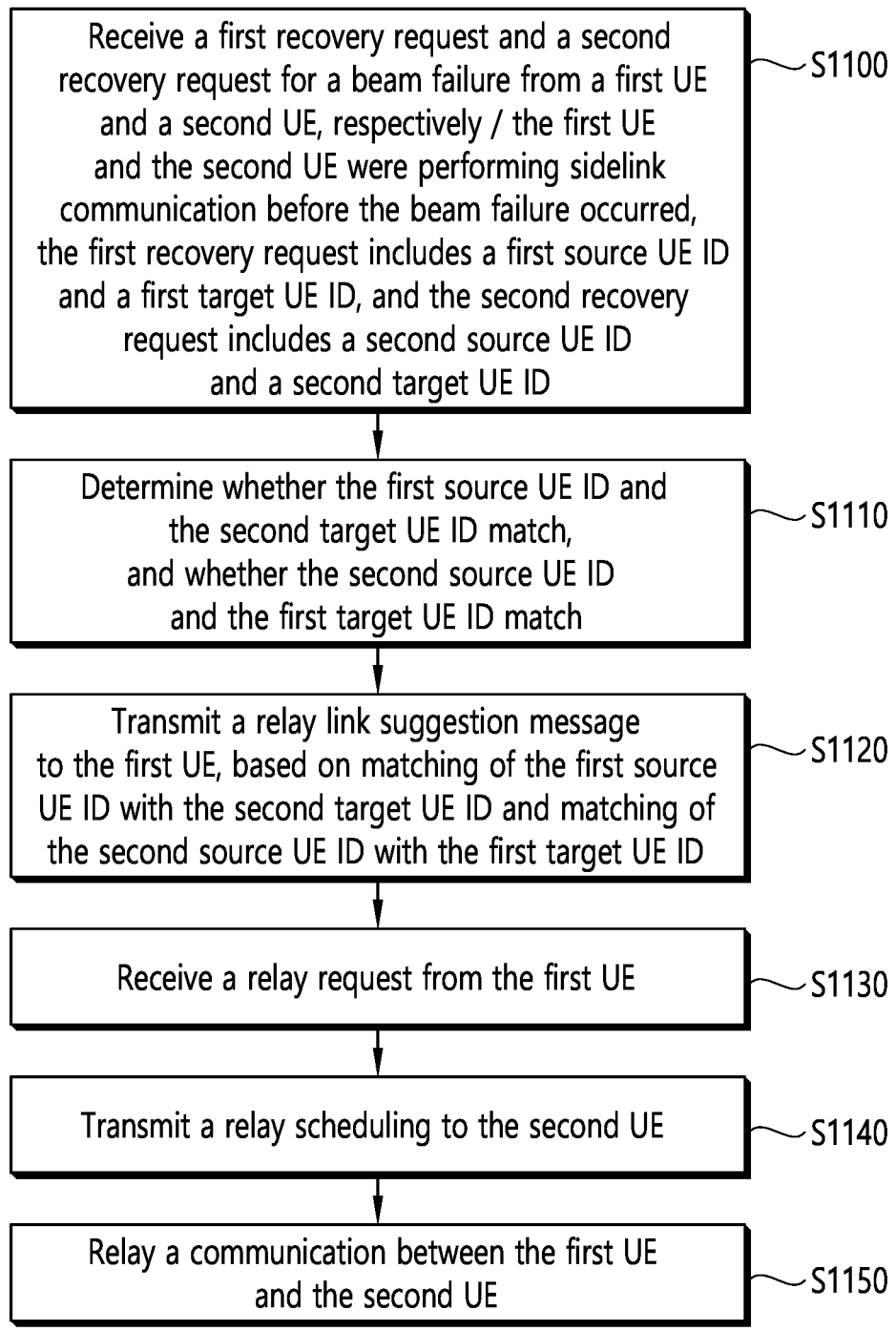
FIG. 11 shows an example of a method performed by a relay UE to which implementations of the present disclosure are applied.

FIG. 11 shows an example of a method performed by a relay UE to which implementations of the present disclosure are applied.

In step S1100, the method comprises receiving a first recovery request and a second recovery request for a beam failure from a first UE and a second UE, respectively. The first UE and the second UE were performing sidelink communication before the beam failure occurred. The first recovery request includes a first source UE ID and a first target UE ID, and the second recovery request includes a second source UE ID and a second target UE ID.

In step S1110, the method comprises determining whether the first source UE ID and the second target UE ID match, and whether the second source UE ID and the first target UE ID match.

In step S1120, the method comprises transmitting a relay link suggestion message to the first UE, based on matching of the first source UE ID with the second target UE ID and matching of the second source UE ID with the first target UE ID.

In step S1130, the method comprises receiving a relay request from the first UE.

In step S1140, the method comprises transmitting a relay scheduling to the second UE.

In step S1150, the method comprises relaying a communication between the first UE and the second UE.

In some implementations, the relay link suggestion message may be transmitted using a beam failure recovery request response message that is a response to the first recovery request and/or a resource for the beam failure recovery request response message. In this case, a particular field of the beam failure recovery request response message may be set to a particular value, indicating that the relay link suggestion message is transmitted using the beam failure recovery request response message and/or the resource for the beam failure recovery request response message.

In some implementations, the first source UE ID and the second target UE ID may indicate the first UE, and the second source UE ID and the first target UE ID may indicate the second UE.

In some implementations, the relay link suggestion message may be transmitted based on a link quality between the relay UE and the first UE and/or a link quality between the relay UE and the second UE satisfying certain conditions.

In some implementations, the relay link suggestion message may include at least one of an ID of the first UE and/or an ID of the second UE. The relay link suggestion message may include at least one of a link quality between the relay UE and the first UE and/or a link quality between the relay UE and the second UE. The relay link suggestion message may include information about time resources and/or frequency resources available for a relay link.

In some implementations, the relay UE may be in communication with at least one of a mobile device, a network, and/or autonomous vehicles other than the relay UE.

Furthermore, the method in perspective of the relay UE described above in FIG. 11 may be performed by the first wireless device 100 shown in FIG. 2, the wireless device 100 shown in FIG. 3, and/or the UE 100 shown in FIG. 4.

More specifically, the relay UE comprises at least one transceiver, at least one processor, and at least one memory operably connectable to the at least one processor. The at least one memory stores instructions that, based on being executed by the at least one processor, perform operations below.

The relay UE receives, using the at least one transceiver, a first recovery request and a second recovery request for a beam failure from a first UE and a second UE, respectively. The first UE and the second UE were performing sidelink communication before the beam failure occurred. The first recovery request includes a first source UE ID and a first target UE ID, and the second recovery request includes a second source UE ID and a second target UE ID.

The relay UE determines whether the first source UE ID and the second target UE ID match, and whether the second source UE ID and the first target UE ID match.

The relay UE transmits, using the at least one transceiver, a relay link suggestion message to the first UE, based on matching of the first source UE ID with the second target UE ID and matching of the second source UE ID with the first target UE ID.

The relay UE receives, using the at least one transceiver, a relay request from the first UE.

The relay UE transmits, using the at least one transceiver, a relay scheduling to the second UE.

The relay UE relays, using the at least one transceiver, a communication between the first UE and the second UE.

In some implementations, the relay link suggestion message may be transmitted using a beam failure recovery request response message that is a response to the first recovery request and/or a resource for the beam failure recovery request response message. In this case, a particular field of the beam failure recovery request response message may be set to a particular value, indicating that the relay link suggestion message is transmitted using the beam failure recovery request response message and/or the resource for the beam failure recovery request response message.

In some implementations, the first source UE ID and the second target UE ID may indicate the first UE, and the second source UE ID and the first target UE ID may indicate the second UE.

In some implementations, the relay link suggestion message may be transmitted based on a link quality between the relay UE and the first UE and/or a link quality between the relay UE and the second UE satisfying certain conditions.

In some implementations, the relay link suggestion message may include at least one of an ID of the first UE and/or an ID of the second UE. The relay link suggestion message may include at least one of a link quality between the relay UE and the first UE and/or a link quality between the relay UE and the second UE. The relay link suggestion message may include information about time resources and/or frequency resources available for a relay link.

Furthermore, the method in perspective of the relay UE described above in FIG. 11 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: obtaining a first recovery request of a first UE and a second recovery request of a second UE for a beam failure, respectively, wherein the first UE and the second UE were performing sidelink communication before the beam failure occurred, wherein the first recovery request includes a first source UE ID and a first target UE ID, and wherein the second recovery request includes a second source UE ID and a second target UE ID; determining whether the first source UE ID and the second target UE ID match, and whether the second source UE ID and the first target UE ID match; and generating a relay link suggestion message, based on matching of the first source UE ID with the second target UE ID and matching of the second source UE ID with the first target UE ID.

Furthermore, the method in perspective of the relay UE described above in FIG. 11 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining a first recovery request of a first UE and a second recovery request of a second UE for a beam failure, respectively, wherein the first UE and the second UE were performing sidelink communication before the beam failure occurred, wherein the first recovery request includes a first source UE ID and a first target UE ID, and wherein the second recovery request includes a second source UE ID and a second target UE ID; determining whether the first source UE ID and the second target UE ID match, and whether the second source UE ID and the first target UE ID match; and generating a relay link suggestion message, based on matching of the first source UE ID with the second target UE ID and matching of the second source UE ID with the first target UE ID.

Figure 12:
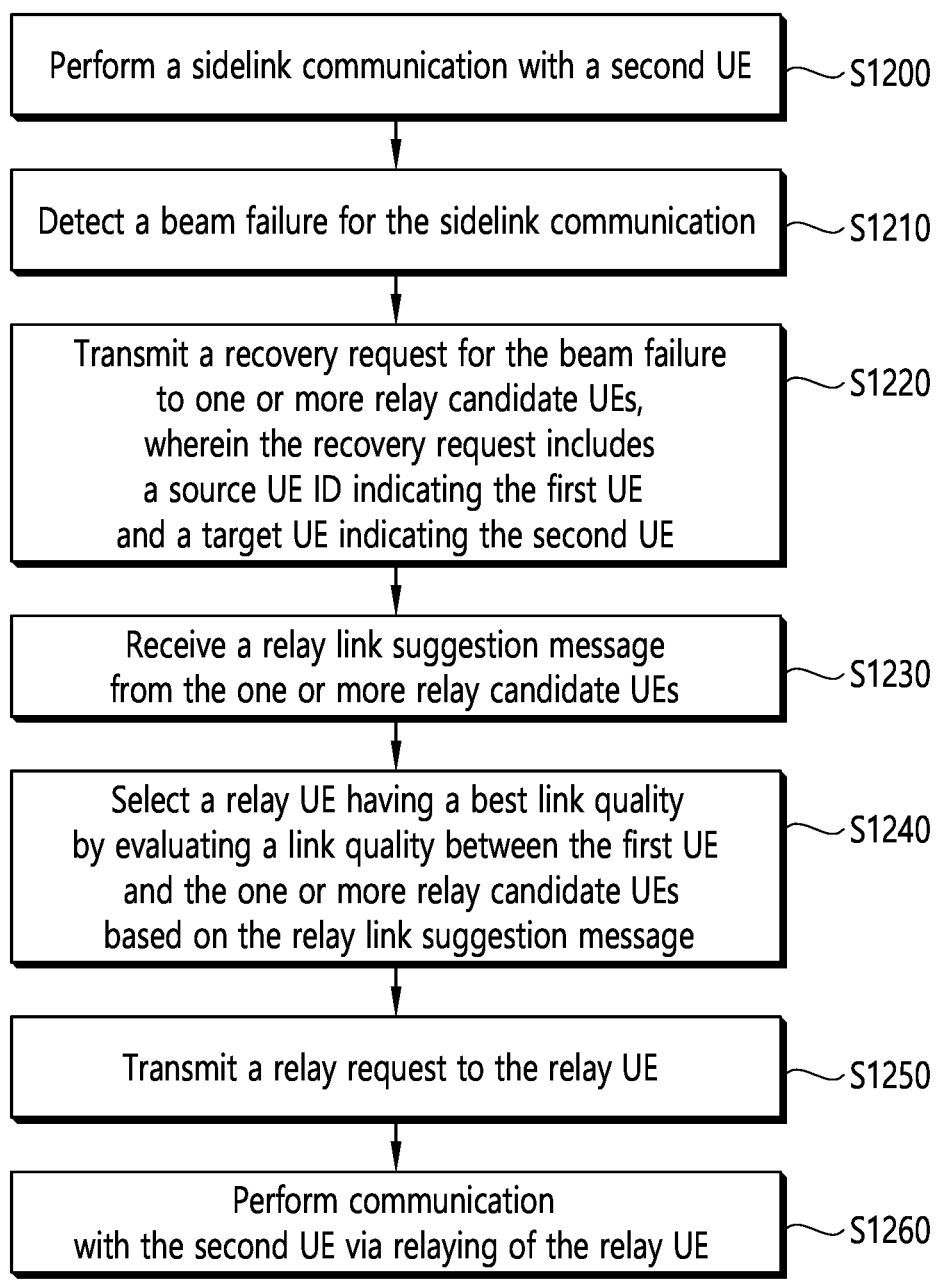
FIG. 12 shows an example of a method performed by a first UE to which implementations of the present disclosure are applied.

FIG. 12 shows an example of a method performed by a first UE to which implementations of the present disclosure are applied.

In step S1200, the method comprises performing a sidelink communication with a second UE.

In step S1210, the method comprises detecting a beam failure for the sidelink communication.

In step S1220, the method comprises transmitting a recovery request for the beam failure to one or more relay candidate UEs. The recovery request includes a source UE ID indicating the first UE and a target UE indicating the second UE.

In step S1230, the method comprises receiving a relay link suggestion message from the one or more relay candidate UEs.

In step S1240, the method comprises selecting a relay UE having a best link quality by evaluating a link quality between the first UE and the one or more relay candidate UEs based on the relay link suggestion message.

In step S1250, the method comprises transmitting a relay request to the relay UE.

In step S1260, the method comprises performing communication with the second UE via relaying of the relay UE.

In some implementations, the relay link suggestion message may be received using a beam failure recovery request response message that is a response to the recovery request and/or a resource for the beam failure recovery request response message. In this case, a particular field of the beam failure recovery request response message may be set to a particular value, indicating that the relay link suggestion message is received using the beam failure recovery request response message and/or the resource for the beam failure recovery request response message.

In some implementations, the relay link suggestion message may be received based on a link quality between the one or more relay candidate UEs and the first UE and/or a link quality between the one or more relay candidate UEs and the second UE satisfying certain conditions.

In some implementations, the relay link suggestion message may include at least one of an ID of the first UE and/or an ID of the second UE. The relay link suggestion message may include at least one of a link quality between the relay UE and the first UE and/or a link quality between the relay UE and the second UE. The relay link suggestion message may include information about time resources and/or frequency resources available for a relay link.

Furthermore, the method in perspective of the first UE described above in FIG. 12 may be performed by the second wireless device 200 shown in FIG. 2, the wireless device 100 shown in FIG. 3, and/or the UE 100 shown in FIG. 4.

The first UE performs, using the at least one transceiver, a sidelink communication with a second UE.

The first UE detects a beam failure for the sidelink communication.

The first UE transmits, using the at least one transceiver, a recovery request for the beam failure to one or more relay candidate UEs. The recovery request includes a source UE ID indicating the first UE and a target UE indicating the second UE.

The first UE receives, using the at least one transceiver, a relay link suggestion message from the one or more relay candidate UEs.

The first UE selects a relay UE having a best link quality by evaluating a link quality between the first UE and the one or more relay candidate UEs based on the relay link suggestion message.

The first UE transmits, using the at least one transceiver, a relay request to the relay UE.

The first UE performs, using the at least one transceiver, communication with the second UE via relaying of the relay UE.

In some implementations, the relay link suggestion message may be received using a beam failure recovery request response message that is a response to the recovery request and/or a resource for the beam failure recovery request response message. In this case, a particular field of the beam failure recovery request response message may be set to a particular value, indicating that the relay link suggestion message is received using the beam failure recovery request response message and/or the resource for the beam failure recovery request response message.

In some implementations, the relay link suggestion message may be received based on a link quality between the one or more relay candidate UEs and the first UE and/or a link quality between the one or more relay candidate UEs and the second UE satisfying certain conditions.

In some implementations, the relay link suggestion message may include at least one of an ID of the first UE and/or an ID of the second UE. The relay link suggestion message may include at least one of a link quality between the relay UE and the first UE and/or a link quality between the relay UE and the second UE. The relay link suggestion message may include information about time resources and/or frequency resources available for a relay link.

Figure 13:
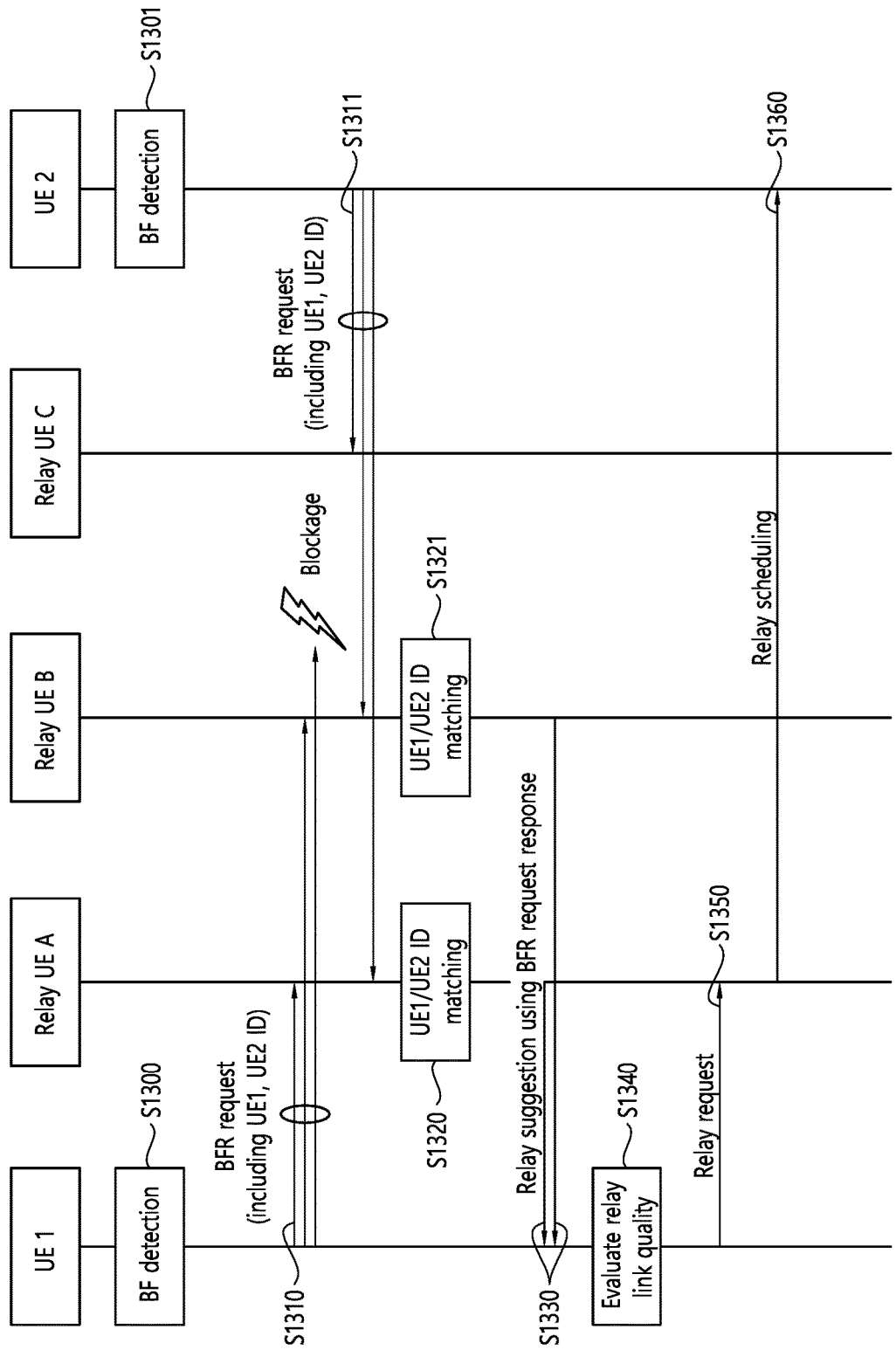
FIG. 13 shows an example of a relay link suggestion procedure to which implementations of the present disclosure are applied.

FIG. 13 shows an example of a relay link suggestion procedure to which implementations of the present disclosure are applied.

Referring to FIG. 13, in accordance with implementations of the present disclosure described above, a procedure is described in which a plurality of UEs that have determined a beam failure transmit a beam failure recovery request, and a relay UE that has received the beam failure recovery request transmits a relay link suggestion using a beam failure recovery request response message/signal structure and/or resources therefor.

In step S1300 and step S1301, UE 1 and UE 2 detect a beam failure, respectively.

In step S1310 and step S1311, UE 1 and UE 2 transmit a beam failure recovery request, respectively. Each beam failure recovery request may include a source UE ID and/or a target UE ID. For example, the beam failure recovery request transmitted by UE 1 in step S1310 may include the ID of UE 1 as the source UE ID and the ID of UE 2 as the target UE ID. For example, the beam failure recovery request transmitted by UE 2 in step S1311 may include the ID of UE 2 as the source UE ID and the ID of UE 1 as the target UE ID.

The relay candidate UEs that are capable of relaying monitor the beam failure recovery request. In FIG. 13, among the relay candidate UEs, relay UE A and relay UE B are assumed to have successfully received the beam failure recovery request transmitted by UE 1 and UE 2. On the other hand, among the relay candidate UEs, relay UE C is assumed to have failed to receive the beam failure recovery request transmitted by UE 1 due to an obstacle.

In step S1320 and step S1321, the relay UE A and the relay UE B, respectively, check whether the IDs of UE 1 and UE 2 are matched. That is, the relay UE A and the relay UE B check whether there is a matching pair among the UEs that transmitted the beam failure recovery request.

In step S1330, the relay UE A and the relay UE B each transmit an RLS to UE 1 using the structure of the beam failure recovery request response message/signal and the resources therefor.

In step S1340, UE 1 evaluates the link quality with relay UE A and relay UE B using the received beam failure recovery request response message/signal and the RLS.

In step S1350, if it is determined that it is best to restore communication over the relay link, UE 1 transmits a relay request to the corresponding relay UE. In FIG. 13, it is assumed that it is determined that it is best to restore communication over the relay link with the relay UE A.

In step S1360, the relay UE A transmits a relay scheduling to UE 2.

The present disclosure can have various advantageous effects.

For example, in a beam failure situation, a beam failure recovery procedure and a relay discovery procedure can be performed without performing separate procedures.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a relay User Equipment (UE) adapted to operate in a wireless communication system, the method comprising:
    receiving a first recovery request and a second recovery request for a beam failure from a first UE and a second UE, respectively, wherein the first UE and the second UE were performing sidelink communication before the beam failure occurred, wherein the first recovery request includes a first source UE Identifier (ID) and a first target UE ID, and wherein the second recovery request includes a second source UE ID and a second target UE ID;
    determining whether the first source UE ID and the second target UE ID match, and whether the second source UE ID and the first target UE ID match;
    transmitting a relay link suggestion message to the first UE, based on matching of the first source UE ID with the second target UE ID and matching of the second source UE ID with the first target UE ID;
    receiving a relay request from the first UE;
    transmitting a relay scheduling to the second UE; and
    relaying a communication between the first UE and the second UE.

2. The method of claim 1, wherein the relay link suggestion message is transmitted using a beam failure recovery request response message that is a response to the first recovery request and/or a resource for the beam failure recovery request response message.

3. The method of claim 2, wherein a particular field of the beam failure recovery request response message is set to a particular value, indicating that the relay link suggestion message is transmitted using the beam failure recovery request response message and/or the resource for the beam failure recovery request response message.

4. The method of claim 1, wherein the first source UE ID and the second target UE ID indicates the first UE, and wherein the second source UE ID and the first target UE ID indicates the second UE.

5. The method of claim 1, wherein the relay link suggestion message is transmitted based on a link quality between the relay UE and the first UE and/or a link quality between the relay UE and the second UE satisfying certain conditions.

6. The method of claim 1, wherein the relay link suggestion message includes at least one of an ID of the first UE and/or an ID of the second UE.

7. The method of claim 1, wherein the relay link suggestion message includes at least one of a link quality between the relay UE and the first UE and/or a link quality between the relay UE and the second UE.

8. The method of claim 1, wherein the relay link suggestion message includes information about time resources and/or frequency resources available for a relay link.

9. The method of claim 1, wherein the relay UE is in communication with at least one of a mobile device, a network, and/or autonomous vehicles other than the relay UE.

10. A relay User Equipment (UE) adapted to operate in a wireless communication system, the relay UE comprising:
    at least one transceiver;
    at least one processor; and
    at least one memory operably connectable to the at least one processor and storing instructions that, based on being executed by the at least one processor, perform operations comprising:
    receiving, using the at least one transceiver, a first recovery request and a second recovery request for a beam failure from a first UE and a second UE, respectively, wherein the first UE and the second UE were performing sidelink communication before the beam failure occurred, wherein the first recovery request includes a first source UE Identifier (ID) and a first target UE ID, and wherein the second recovery request includes a second source UE ID and a second target UE ID;
    determining whether the first source UE ID and the second target UE ID match, and whether the second source UE ID and the first target UE ID match;
    transmitting, using the at least one transceiver, a relay link suggestion message to the first UE, based on matching of the first source UE ID with the second target UE ID and matching of the second source UE ID with the first target UE ID;
    receiving, using the at least one transceiver, a relay request from the first UE;
    transmitting, using the at least one transceiver, a relay scheduling to the second UE; and
    relaying, using the at least one transceiver, a communication between the first UE and the second UE.

11. A method performed by a first User Equipment (UE) adapted to operate in a wireless communication system, the method comprising:
    performing a sidelink communication with a second UE;
    detecting a beam failure for the sidelink communication;
    transmitting a recovery request for the beam failure to one or more relay candidate UEs, wherein the recovery request includes a source UE ID indicating the first UE and a target UE indicating the second UE;
    receiving a relay link suggestion message from the one or more relay candidate UEs;
    selecting a relay UE having a best link quality by evaluating a link quality between the first UE and the one or more relay candidate UEs based on the relay link suggestion message;

transmitting a relay request to the relay UE; and
performing communication with the second UE via relaying of the relay UE.

12. The method of claim 11, wherein the relay link suggestion message is received using a beam failure recovery request response message that is a response to the recovery request and/or a resource for the beam failure recovery request response message.

13. The method of claim 12, wherein a particular field of the beam failure recovery request response message is set to a particular value, indicating that the relay link suggestion message is received using the beam failure recovery request response message and/or the resource for the beam failure recovery request response message.

14. The method of claim 11, wherein the relay link suggestion message is received based on a link quality between the one or more relay candidate UEs and the first UE and/or a link quality between the one or more relay candidate UEs and the second UE satisfying certain conditions.

15. The method of claim 11, wherein the relay link suggestion message includes i) at least one of an ID of the first UE and/or an ID of the second UE, ii) at least one of a link quality between the one or more relay candidate UEs and the first UE and/or a link quality between the one or more relay candidate UEs and the second UE, and/or iii) information about time resources and/or frequency resources available for a relay link.

* * * * *